US012786788B2

(12) United States Patent
Shatil et al.

(10) Patent No.: US 12,786,788 B2
(45) Date of Patent: Nov. 3, 2026

(54) DIAGNOSTIC SYSTEM AND METHOD FOR ASSOCIATING DATAGRAM LOSS WITH NETWORK SEGMENTS

(71) Applicant: ZEBRA TECHNOLOGIES CORPORATION, Lincolnshire, IL (US)

(72) Inventors: Ohad Shatil, Dunwoody, GA (US); Subramani Rajendiran, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 343 days.

(21) Appl. No.: 18/654,934

(22) Filed: May 3, 2024

(65) Prior Publication Data

US 2025/0344101 A1 Nov. 6, 2025

(51) Int. Cl.

| | |
|---|---|
| ***H04W 28/04*** | (2009.01) |
| ***H04L 1/1607*** | (2023.01) |
| ***H04L 47/34*** | (2022.01) |

(52) U.S. Cl.

CPC ........... *H04W 28/04* (2013.01); *H04L 1/1607* (2013.01); *H04L 47/34* (2013.01)

(58) Field of Classification Search

CPC .... H04W 28/04; H04L 1/1607; H04L 1/1642; H04L 47/34

See application file for complete search history.

(56) References Cited

U.S. PATENT DOCUMENTS

| | | | | |
|---|---|---|---|---|
| 2007/0230361 | A1* | 10/2007 | Choudhury | H04L 41/5003 370/250 |
| 2013/0145236 | A1* | 6/2013 | Baker | H04L 1/0057 714/E11.01 |
| 2015/0289171 | A1* | 10/2015 | Jung | H04L 1/0001 370/331 |
| 2017/0264558 | A1* | 9/2017 | Higuchi | H04L 1/203 |
| 2017/0346707 | A1* | 11/2017 | Menon | H04L 43/0811 |
| 2017/0373950 | A1* | 12/2017 | Szilagyi | H04L 41/00 |
| 2018/0176816 | A1* | 6/2018 | Meylan | H04L 47/2433 |
| 2019/0116535 | A1* | 4/2019 | Szilagyi | H04L 43/0829 |
| 2020/0187068 | A1* | 6/2020 | Raghunath | H04W 36/00837 |
| 2020/0359356 | A1* | 11/2020 | Sirotkin | H04L 1/1685 |

(Continued)

FOREIGN PATENT DOCUMENTS

| | | | |
|---|---|---|---|
| CN | 106100803 A | * 11/2016 | H04L 1/1877 |
| CN | 110505092 A | * 11/2019 | H04L 69/22 |

(Continued)

*Primary Examiner* — Sujoy K Kundu
*Assistant Examiner* — Vladislav Y Agureyev

(57) ABSTRACT

A method in a computing device includes: receiving, at a wireless communications interface of the computing device over a downlink segment of a connection with a source device, a series of datagrams from the source device, each of the datagrams including a source sequence number and a transmitter sequence number; determining a size of a first gap in the source sequence numbers of the datagrams; determining a size of a second gap in the transmitter sequence numbers of the datagrams; based on the size of the first gap and the size of the second gap, generating a datagram loss indicator and an association of the datagram loss indicator with a portion of the connection; and executing a mitigation action based on the datagram loss indicator.

20 Claims, 7 Drawing Sheets

(56) References Cited

U.S. PATENT DOCUMENTS

| | | | | |
|---|---|---|---|---|
| 2021/0092061 | A1* | 3/2021 | Zhou | H04L 41/0806 |
| 2021/0359939 | A1* | 11/2021 | Wan | H04L 47/2441 |
| 2021/0385147 | A1* | 12/2021 | Cohen | H04L 1/1854 |
| 2022/0182304 | A1* | 6/2022 | Yu | H04L 47/34 |
| 2022/0361060 | A1* | 11/2022 | Wallentin | H04W 36/08 |
| 2023/0043833 | A1* | 2/2023 | Wang | H04W 36/0235 |
| 2024/0114399 | A1* | 4/2024 | Teyeb | H04W 36/0007 |
| 2026/0067236 | A1* | 3/2026 | Duan | H04L 1/1819 |

FOREIGN PATENT DOCUMENTS

| | | | | |
|---|---|---|---|---|
| CN | 114172900 | A * | 3/2022 | H04L 63/02 |
| CN | 115297194 | A * | 11/2022 | H04L 69/22 |
| CN | 117914850 | A * | 4/2024 | H04L 12/18 |
| WO | WO-2019001042 | A1 * | 1/2019 | H04L 43/0835 |

* cited by examiner

DIAGNOSTIC SYSTEM AND METHOD FOR ASSOCIATING DATAGRAM LOSS WITH NETWORK SEGMENTS

BACKGROUND

Packet loss can lead to stuttering or other perceptible performance in communications applications (e.g., a voice call application). A variety of factors can lead to packet loss, and diagnosing the cause of packet loss can therefore be a time-consuming exercise.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
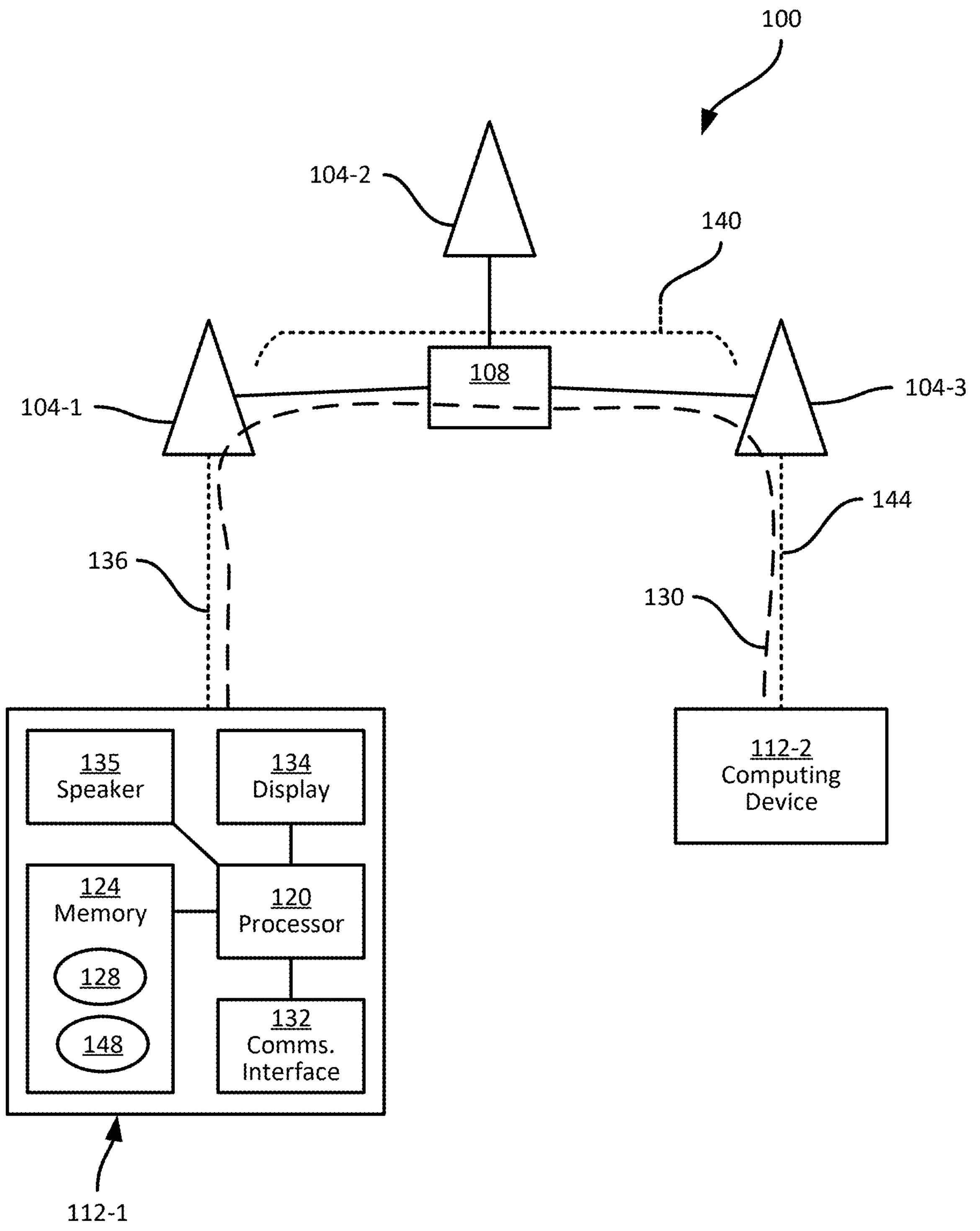
FIG. 1 is a diagram of a wireless communications system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device including: receiving, at a wireless communications interface of the computing device over a downlink segment of a connection with a source device, a series of datagrams from the source device, each of the datagrams including a source sequence number and a transmitter sequence number; determining a size of a first gap in the source sequence numbers of the datagrams; determining a size of a second gap in the transmitter sequence numbers of the datagrams; based on the size of the first gap and the size of the second gap, generating a datagram loss indicator and an association of the datagram loss indicator with a portion of the connection; and executing a mitigation action based on the datagram loss indicator.

Additional examples disclosed herein are directed to a computing device, comprising: a wireless communications interface; and a processor configured to: receive, via the wireless communications interface over a downlink segment of a connection with a source device, a series of datagrams from the source device, each of the datagrams including a source sequence number and a transmitter sequence number; determine a size of a first gap in the source sequence numbers of the datagrams; determine a size of a second gap in the transmitter sequence numbers of the datagrams; based on the size of the first gap and the size of the second gap, generate a datagram loss indicator and an association of the datagram loss indicator with a portion of the connection; and execute a mitigation action based on the datagram loss indicator.

Further examples disclosed herein are directed to a non-transitory computer-readable medium storing a plurality of computer readable instructions executable by a processor of a computing device to: receive, via a wireless communications interface of the computing device over a downlink segment of a connection with a source device, a series of datagrams from the source device, each of the datagrams including a source sequence number and a transmitter sequence number; determine a size of a first gap in the source sequence numbers of the datagrams; determine a size of a second gap in the transmitter sequence numbers of the datagrams; based on the size of the first gap and the size of the second gap, generate a datagram loss indicator associated and an association of the datagram loss indicator with a portion of the connection; and execute a mitigation action based on the datagram loss indicator.

FIG. 1 illustrates a wireless communications system 100, including one or more wireless networks, such as wireless local area networks (WLANs) based on the Institute of Electrical and Electronics Engineers (IEEE) 802.11 family of standards (e.g., one or more Wi-Fi™ networks). In other embodiments, the system 100 can include one or more wide-area wireless networks (WWANs), such as cellular networks or the like, in addition to or instead of WLANs. As will be apparent in the discussion below, the functionality implemented in the system 100 can be applied to any of a variety of packet-switched wireless networks, including both local-area and wide-area networks. The system 100 can also include wired networks, e.g., interconnecting one or more of the wireless networks.

In the illustrated example, the system 100 includes a wireless network implemented by at least one base station, such as a wireless access point (AP) in the case of a WLAN. In the discussion below, the network is described as a WLAN, and the base stations are described as APs, but it will be understood that other forms of base station (e.g., gNB base stations in the context of cellular packet-switched networks).

The system 100 includes example access points 104-1, 104-2, and 104-3 which are referred to collectively herein as the access points 104, and generically as an access point 104. Similar nomenclature may also be used herein for other numbered components with hyphenated suffixes. The system 100 can include more than three access points 104, or fewer than three access points 104, in other examples.

Each AP 104 can include an enclosure housing one or more controllers, transceivers, antenna assemblies, and the like. The APs 104 can, as in the illustrated example, be connected with a distribution subsystem (DS) 108. The distribution subsystem 108 can include a network controller and/or one or more routers, switches, and the like, e.g., configured to route data between the APs, and/or between the network implemented by the system 100 and other networks. In some cases, some or all of the DS 108 can be implemented within one of the APs 104.

Client devices within the system 100 can establish wireless communications with other devices within the network and/or with other devices outside the network (e.g., via a gateway implemented by the DS 108 or other suitable network infrastructure). As will be apparent, devices in the network can roam between the APs 104 implementing the network, e.g., according to signal strength, congestion, band preferences, and the like.

In the present example, the system 100 includes a wireless computing device 112-1 connected to the AP 104-1, and a wireless computing device 112-2 connected to the AP 104-3. The devices 112 can be, for example, mobile computers, smartphones, mobile printers, barcode scanners, tablet computers, or the like. The system 100 can include other forms of computing device, such as application servers or the like, e.g., connected to the DS 108 to enable wireless devices to communicate therewith.

Certain internal components of the device 112-1 are shown, and the computing device 112-2 will be understood to include functionally equivalent components, although the form factor and specific hardware elements of the computing device 112-2 need not match those of the device 112-1.

The device 112-1 includes a processor 120, such as a central processing unit (CPU), graphics processing unit (GPU), application-specific integrated circuit (ASIC), or the like, communicatively coupled with a non-transitory computer-readable storage medium such as a memory 124, e.g., a combination of volatile memory elements (e.g., random access memory (RAM)) and non-volatile memory elements (e.g., flash memory or the like). The memory 124 stores a plurality of computer-readable instructions in the form of applications, including in the illustrated example a communications application 128, whose execution by the processor 120 configures the device 112-1 to establish communications sessions with other devices, such as a voice over IP (VOIP) session 130 with the device 112-2. The communications sessions established via execution of the application 128 can include any one or more of a voice call, a video call, a file transfer operation, or the like.

The device 112 also includes a communications interface 132, enabling the device 112-1 to establish connections with networks such as the network implemented by the APs 104 and the DS 108. The communications interface 132 can therefore include any suitable combination of transceivers, antenna elements, and corresponding control hardware enabling communications with the APs 104. The processor 120, memory 124, and communications interface 132 can be implemented as components of a system-on-chip (SoC) assembly, in some examples. The device 112-1 can also include input devices such as a touch screen, a microphone, a camera, or the like, and output devices such as a display 134, a speaker 135, and the like.

Various factors may influence the performance of the session 130. For example, the loss of datagrams (e.g., packets) transmitted by the device 112-2, such that those datagrams are not successfully received at the device 112-1, can lead to reduced communications session performance. For example, file transfer operations may experience reduced transfer rates, and VOIP sessions may experience audible stuttering, or the like. If the causes of packet loss can be successfully diagnosed, adaptations to the network (e.g., to one or more of the device 112-1, the device 112-2, the APs

104, and the DS 108) may mitigate future packet loss for the communication session 130 and/or other sessions. One component of packet loss diagnosis that can facilitate such mitigation is identifying which segment of the network experienced the packet loss.

For example, when datagrams destined for the device 112-1 are lost, diagnosis and network adaptations may benefit from associating the datagram loss with one or more of a downlink segment 136, a distribution segment 140, and an uplink segment 144. The downlink segment 136 is the final segment of a connection between the devices 112-1 and 112-2. The downlink segment 136 is a wireless segment between a transmitter (e.g., the AP 104-1 in this embodiment) and the destination (e.g., the device 112-1). The transmitter is therefore the final sender of data towards the destination. The uplink segment 144 is the first segment of the connection between the devices 112-1 and 112-2, and in this example is a segment between the sender or source device (the device 112-2) and the initial receiver (the AP 104-3). The source, in other words, is the originator of data for eventual delivery to the destination (e.g., via one or more additional, devices, ultimately including the transmitter mentioned above). The uplink segment 144 is also wireless, in the illustrated example, although in some examples the uplink segment can be wired. The distribution segment 140 is defined by one or more links between the uplink segment 144 and the downlink segment 136, e.g., wired links between the AP 104-3, switches or the like within the DS 108, and the AP 104-1.

Previous systems may detect datagram loss, but may be unable to associate such datagram loss with particular connection segments. Further, such systems may rely on functionality implemented within the DS 108, which may have limited visibility into the session 130 due to encryption.

The devices 112-1 and 112-2, as described below, implement functionality to detect datagram loss and associate such datagram loss with portions of the connection between the devices 112-1 and 112-2, and in some cases to the specific segments 136, 140, and 144. Each device 112, for example, may be configured to detect datagram loss indicators for received traffic, corresponding to certain segments or portions (e.g., a portion including two segments) of the connection carrying the session 130.

To implement the above functions, the device 112-1 includes a monitoring application 148. The monitoring application 148, in this example, is distinct from the application 128. Implementing the monitoring application 148 separately facilitates datagram loss detection and association with network segments across sessions implemented by multiple communications applications, without implementing the detection and diagnosis functionality into each of a potentially large number of distinct communications applications.

Figure 2:
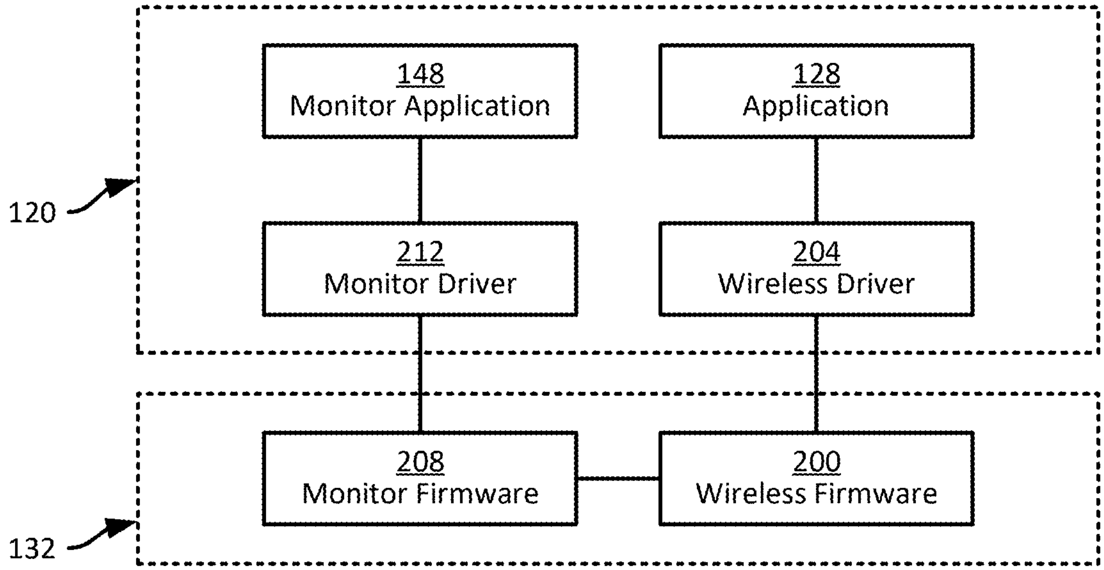
FIG. 2 is an example wireless communications monitoring architecture in a computing device of the system of FIG. 1.

The monitoring application 148 can be stored in the memory 124, as shown in FIG. 1. In other examples, the monitoring application 144 can reside in the communications interface 132, e.g., as a component of firmware of the communications interface 132, executed by a dedicated controller distinct from the processor 120. FIG. 2 illustrates an example architecture for implementing the functions performed via execution of the monitoring application 148. In the example of FIG. 2, a wireless firmware component, e.g., stored and executed at the communications interface 132, is configured to control antennas and other hardware elements of the interface 132, and forward decrypted datagrams to a driver 204 (e.g., a component of an operating system of the device 112-1, executed by the processor 120).

The driver 204, in turn, can forward the application data in the datagrams to the application 128 for processing (e.g., for output via the display 134 and/or speaker 135).

The device 112-1 supports a monitor mode, and therefore the firmware 200 can also pass decrypted datagrams to a monitor firmware component 208, which is configured to pass the datagrams to a monitor driver 212, for delivery to the monitoring application 148. In other words, datagrams arriving at the device 112-1 and associated with the application 128 can be processed in parallel by both the application 128 and the monitoring application 148.

In the discussion below, it will be understood that functions described as being performed by the device 112 or by the processor 120 can be performed by either or both of the processor 120, and a controller of the communications interface 132.

Figure 3:
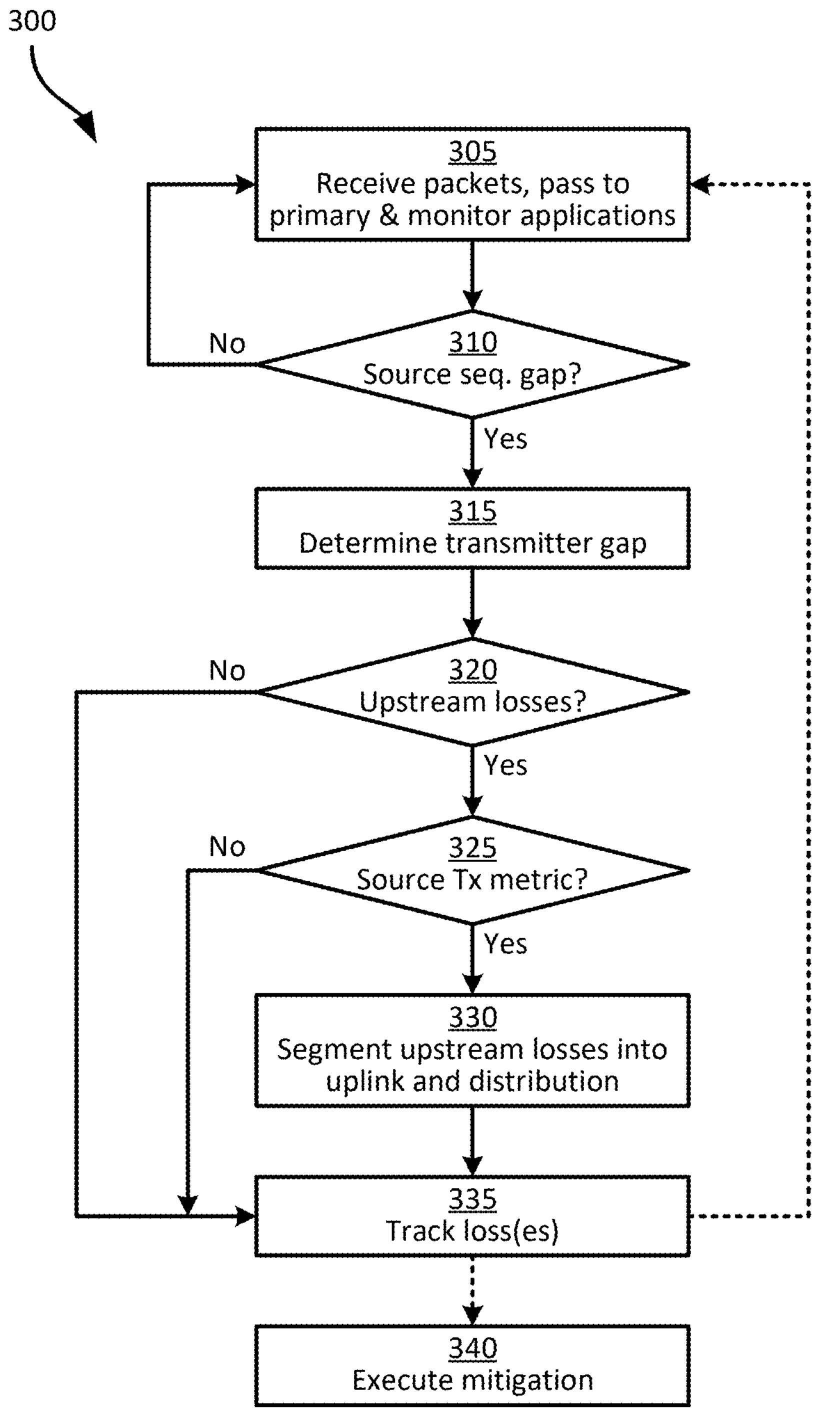
FIG. 3 is a flowchart of a method of associating datagram loss with network segments.

Turning to FIG. 3, a method 300 of associating datagram loss with network segments is illustrated. The method 300 is described below in conjunction with its performance by the device 112-1, but it will be understood that the method 300 can also be performed by a wide variety of other computing devices, including the device 112-2. The method 300 can be performed by the device 112-1 via the execution of the application 148 by the processor 120 and/or a controller of the communications interface 132, in embodiments in which the communications interface 132 includes a separate controller.

At block 305, the device 112-1 is configured to receive a series of datagrams (e.g., packets, frames, or the like) over the downlink segment 136 of the connection with the source device (e.g., the device 112-2 in this example). The series of datagrams can contain application data such as audio data, video data, or the like, associated with the application 128. The device 112-1 is configured to process the received datagrams via the application 128 and the monitoring application 148. The remainder of the method 300 described below is implemented by the monitoring application 148, and it will be understood that processing by the application 128 can proceed in parallel to performance to the method 300. Further, it will be understood that the device 112-1 can perform more than one instance of the method 300, e.g., for each communications session conducted by the device 112-1 via distinct communications applications.

Figure 4:
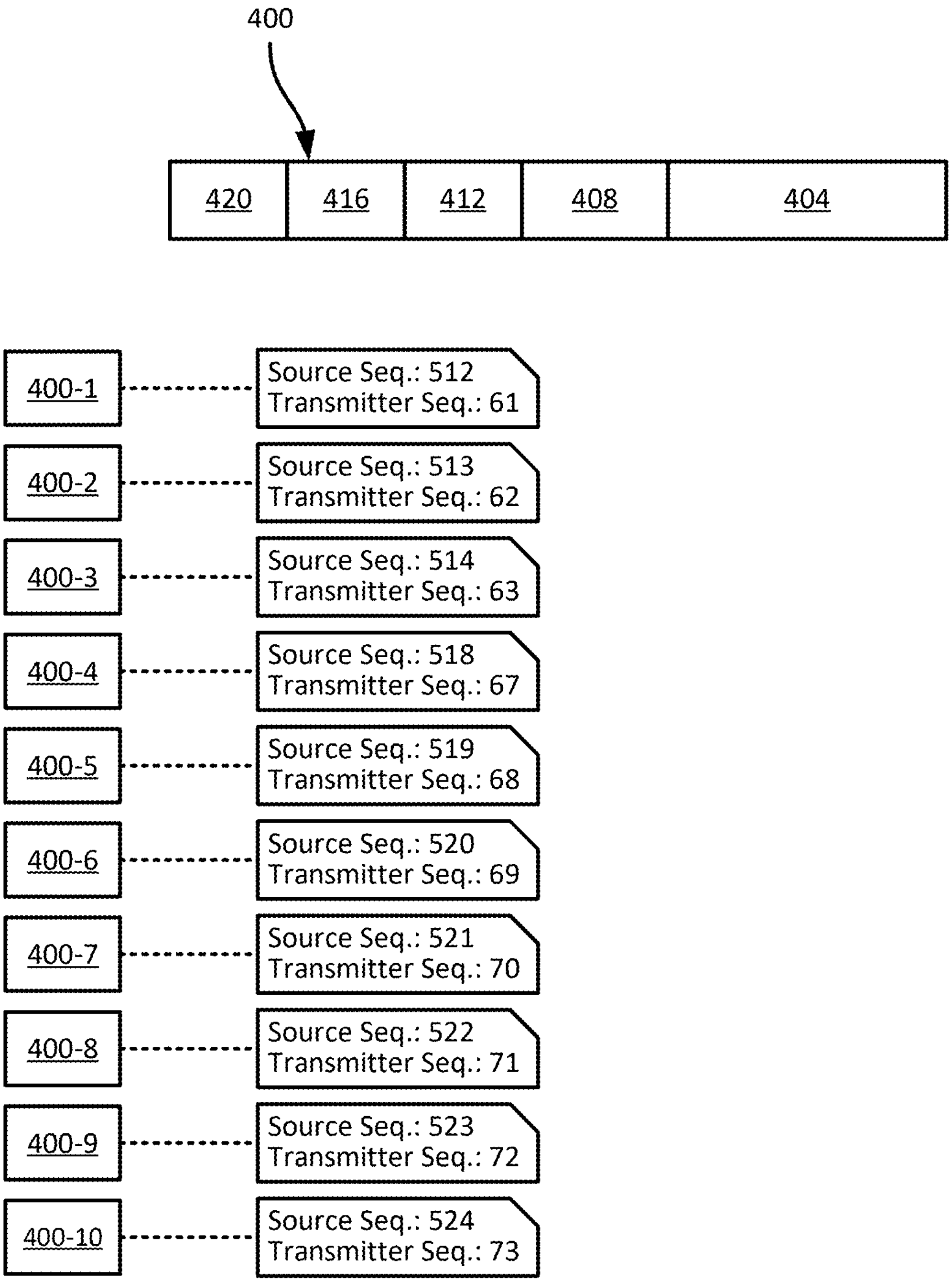
FIG. 4 is a diagram illustrating an example series of datagrams processed via blocks 305-320 of the method of FIG. 2.

At block 310, the device 112-1 is configured to determine whether the series of datagrams received at block 305 include at least one gap in source sequence numbers thereof. Turning to FIG. 4, an example datagram 400 is illustrated, as received at the communications interface 132. The datagram 400 includes a payload 404, such as a block of audio data, video data, or the like. The datagram 400 also includes a set of headers, at least some of which include sequence numbers, e.g., used to re-assemble a series of datagrams into a predetermined order for rendering. For example, the source device (e.g., the device 112-2, executing another instance of the application 128) can encapsulate the payload 404 in an application-level header 408. For example, the application 128 can use the real time transfer protocol (RTP) to exchange data with other devices, and the application-level header 408 can therefore be implemented as a real time transfer protocol (RTP) header, including a source sequence number. The source sequence number is referred to as a "source" number because it originates at the source device (112-2, in this example), and persists throughout the connection, being received at the device 112-1.

The datagram 400 can also include a transport-level header 412, such as a universal datagram protocol (UDP) header. The header 412 need not include a further sequence number (e.g., UDP headers are generally not sequenced), but in some examples the header 412 can include another sequence number, for example if a transport-level protocol such as the transmission control protocol (TCP) is employed. The source device, e.g., at the communications interface thereof, can further encapsulate the payload 400 and headers 408 and 412 with an Internet-layer header 416, such as an Internet Protocol (IP header). The header 416 can also include a sequence number that may be employed as a source sequence number in the method 300, e.g., instead of the sequence number of the application-level header 408.

The datagram 400 can be further encapsulated, e.g., prior to wireless transmission by the communications interface of the device 112-2, with a link-level header 420 (and in some cases, a link-level footer, not shown). The link-level header 420, such as a media access control (MAC) header, can include a further sequence number. The sequence number of the header 420 is referred to as a transmitter sequence number, because such a sequence number does not persist to the destination of the datagram 400. Instead, upon receipt of the datagram 400 at the AP 104-3, the AP 104-3 may remove the header 420 and route the datagram 400 to the DS 108, e.g., with a different link-level header. The payload 404 and headers 408, 412, and 416 may further be de-encapsulated and encapsulated with a succession of distinct link-level headers at each further network hop. In other words, each transmitting entity (e.g., the device 112-2, then the AP 104-3, then the DS 108, then the AP 104-1) may replace a prior link-level header with a new link-level header. The sequence numbers in such headers are therefore referred to as transmitter sequence numbers.

It will be understood that the headers discussed above also include other data such as source and destination addresses, protocol identifiers, and the like. Those elements are omitted from FIG. 4 for clarity of illustration.

FIG. 4 also illustrates a series of datagrams 400-1, 400-2, 400-3, 400-4, 400-5, 400-6, 400-7, 400-8, 400-9, and 400-10 received at the device 112-1, e.g., in the order they are received (although the datagrams 400 may be received in other orders). FIG. 4 also illustrates the source sequence number (e.g., from the application-level header 408) and the transmitter sequence number (e.g., from the link-level header 420) of each datagram 400. At block 310, the device 112-1 is configured to determine whether any gaps appear in the source sequence numbers. The series of datagrams 400 that the device 112-1 processes for each performance of block 310 can include, for example, each datagram 400 associated with the application 128 that is received at the device 112-1.

In this example performance of block 310, the device 112-1 identifies a gap in the source sequence numbers. In particular, as seen in FIG. 4, the source sequence numbers "515", "516", and "517" are missing from the series of datagrams 400. The determination at block 310 is therefore affirmative. The series of datagrams 400 shown in FIG. 4 has a total gap size of three (e.g., three contiguous source sequence numbers are unaccounted for). When the determination at block 310 is negative, the device 112-1 can return to block 305 to await further datagrams 400 (or the method 300 can end, e.g., if the communications session 130 is terminated).

When the determination at block 310 is affirmative, at block 315 the device 112-1 is configured to determine a size of a second gap in the transmitter sequence numbers. Referring again to FIG. 4, the size of the second gap in this example is three, because the transmitter sequence numbers "64", "65", and "66" are missing. Based on the gap size determined at block 310, and on the gap size determined at block 315 (including a null gap size for block 315, if there is no transmitter gap), the device 112-1 is configured to determine datagram loss indicators for at least the downlink segment 136 and an upstream portion of the connection, including the DS segment 140 and the uplink segment 144. The upstream portion, in other words, includes any portion of the connection other than the downlink segment 136. Under some conditions, discussed further below, the device 112-1 can determine separate datagram loss indicators for each of the DS segment 140 and the uplink segment 144.

In this example, the datagram loss indicator corresponding to the downlink 136 is the gap size determined at block 315. The datagram loss indicator corresponding to the upstream portion of the connection is dependent on the determination at block 320.

At block 320, the device 112-1 is configured to determine whether any upstream datagram losses have occurred, by determining a difference between the first gap size from block 310, and the second gap size from block 315. For example, the device 112-1 can be configured to subtract the second gap size (e.g., three, in this example) from the first gap size (e.g., also three in this example) and determine whether the difference is non-zero. When the difference is zero, as in this example, there are no upstream losses and performance of the method 300 can bypass blocks 325 and 330, and proceed to block 340.

The determination at block 320 is negative in this example because missing transmitter sequence numbers indicate transmission failures at the downlink segment 136. Each missing transmitter sequence number is expected to result in the absence of a source sequence number, and therefore when the number of missing source sequence numbers equals the number of missing transmitter sequence numbers, the gaps can be explained by downlink losses. The datagram loss indicator corresponding to the upstream portion of the connection with the device 112-2 is therefore zero.

At block 335, the device 112-1 is configured to track any losses detected via blocks 315 and 320, for example by logging the losses (e.g., gap sizes, corresponding connection segments, timestamps, and the like). The device 112-1 can then return to block 305 to continue monitoring incoming datagrams for further gaps (e.g., any further contiguous gaps in source sequence numbers). In some examples, the device 112-1 can also proceed to block 340. Block 340 can be, but need not be, performed following each gap detection. For example, the device 112-1 can be configured to perform block 340 after each gap detection, or can be configured to accumulate gap detections via the remainder of the method 300 and perform gap 340 periodically. In some examples, the device 112-1 can perform block 340 at a predetermined frequency (e.g., once per hour, or any other suitable time period), and/or when a predetermined number of gaps or accumulated gap size have been detected.

Figure 5:
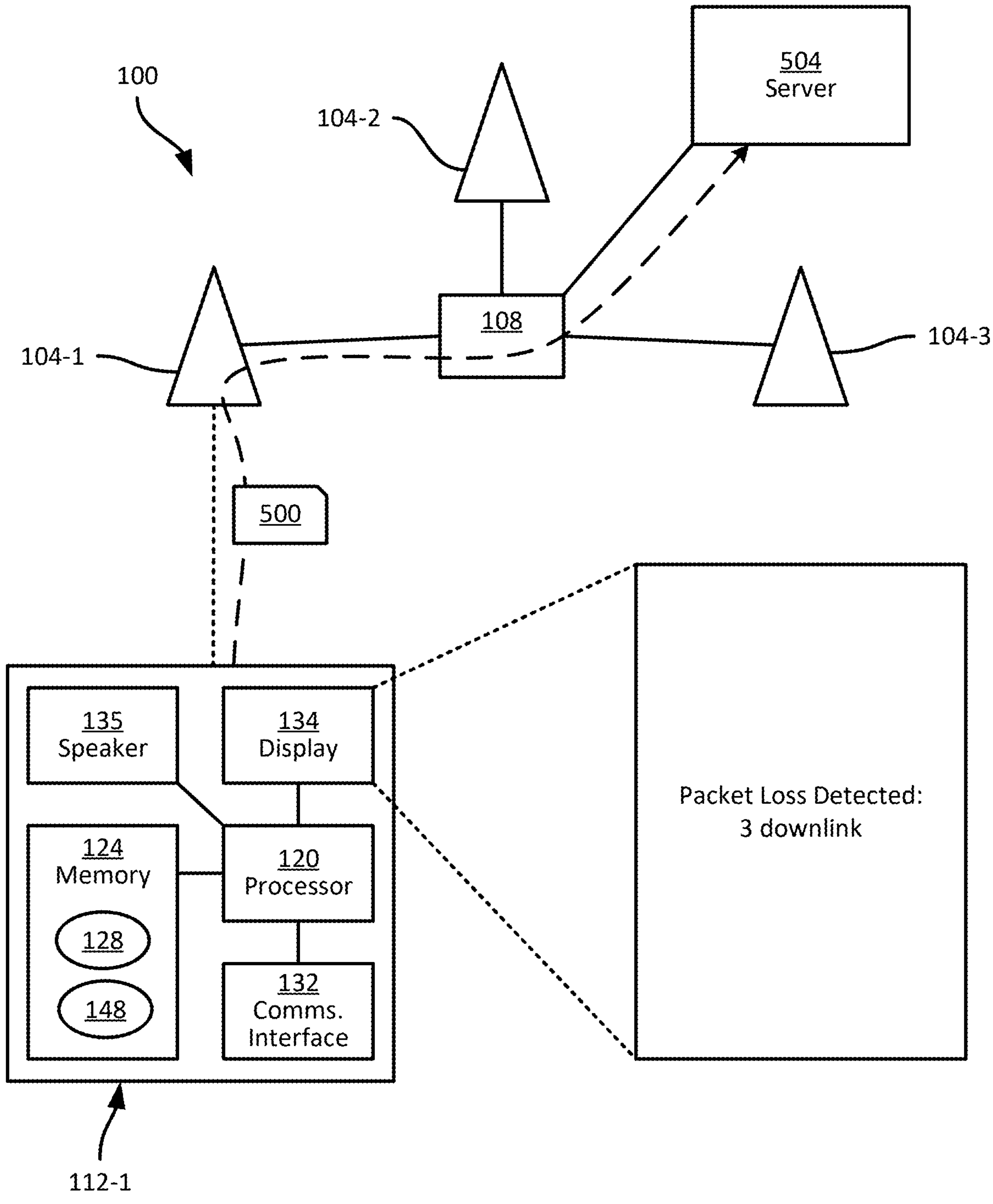
FIG. 5 is a diagram illustrating an example performance of block 340 of the method of FIG. 2.

At block 340, the device 112-1 is configured to execute one or more mitigation actions, based on the datagram loss indicators corresponding to the downlink 136 and the upstream portion of the connection with the device 112-2. The mitigation action can include, for example, generating a notification via the display 134 or other output device, and/or transmitting a notification to another computing device. For example, FIG. 5 illustrates an example performance of block 340 in which the device 112-1 presents a notification on the display 134 indicating that three packets were lost on the downlink 136. The device 112-1 also, in the illustrated example, sends a message 500 to a server 504 containing the datagram loss indicator and the associated connection segment. The message 500 can include various other information, including a timestamp, a device identifier (e.g., a serial number, model number, MAC address, or the like), an identifier of the application 128, an identifier of the device 112-2, and the like. The server 504 can be configured to collect such messages for diagnostic purposes and/or to implement configuration changes in the network infrastructure of the system 100.

Figure 6:
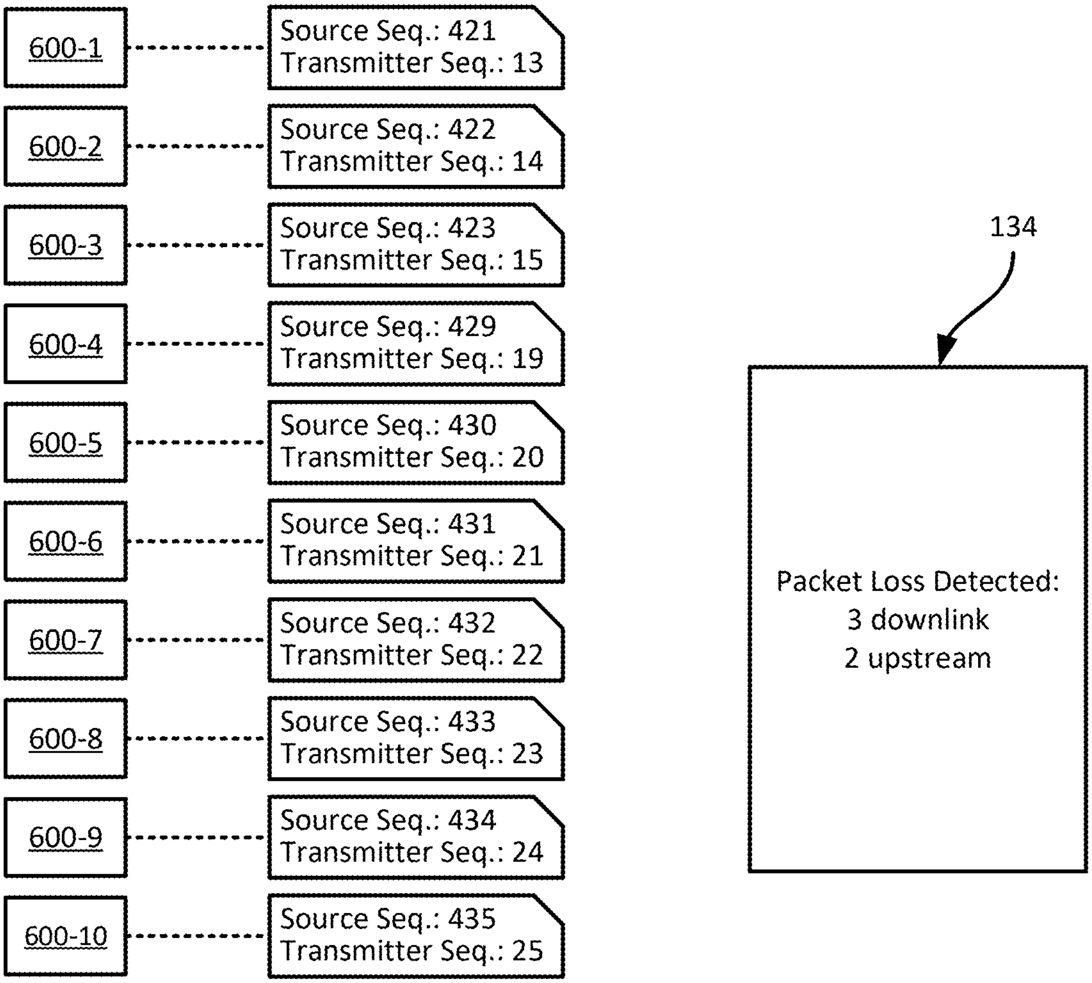
FIG. 6 is a diagram illustrating another example series of datagrams processed via blocks 305-325 of the method of FIG. 2.

FIG. 6 illustrates a further example performance of the method 300. In this example, a series of datagrams 600-1, 600-2, 600-3, 600-4, 600-5, 600-6, 600-7, 600-8, 600-9, and 600-10 are received at the device 112-1. At block 310, the device 112-1 identifies a first gap consisting of five missing source sequence numbers (424 to 428). At block 315, the device 112-2 identifies a second gap consisting of three transmitter sequence numbers (16, 17, and 18). The datagram loss indicator corresponding to the downlink 136 is therefore three, and the determination at block 320 is affirmative because the difference between the first gap and the second gap is non-zero. Referring to FIG. 3, when the determination at block 320 is affirmative, the device 112-1 proceeds to block 325. At block 325 the device 112-1 is configured to determine whether a source transmission metric, such as a count of transmission failures experienced on the uplink 144, is available.

The source transmission metric can be stored in a custom field of the header 416, for example (e.g., inserted into the IP header 416 by the communications interface of the device 112-2). For example, the device 112-2 can be configured, for each period (e.g., a second, or the like), to insert a count of failed datagram transmissions that have occurred during that period. The device 112-1 can be configured to inspect the header 416 of each received datagram 400 to determine whether a transmission failure count is present. In some examples, the devices 112 can indicate to one another, e.g., when the connection between the devices 112 is established, whether each device 112 supports the use of the above-mentioned field, e.g., in the form of an IP protocol extension. When the device 112-2 does not support the extension, and/or when the field does not appear in the datagrams 400 received at the device 112-1, the determination at block 325 is negative, and the device 112-1 proceeds to block 335.

At block 340 in this example, the device 112-1 can generate a notification (e.g., and/or a message to the server 504) including the datagram loss indicator for the downlink 136 (indicating three lost packets). The notification can also include a datagram loss indicator for the upstream portion of the connection, indicating the two additional packets were lost in either or both of the DS segment 140 and the uplink segment 144 (that is, the upstream portion). In the absence of the transmission failure data from the device 112-2, the device 112-1 may not be able to associate lost datagrams specifically with the DS segment 140 or the uplink segment 144.

Figure 7:
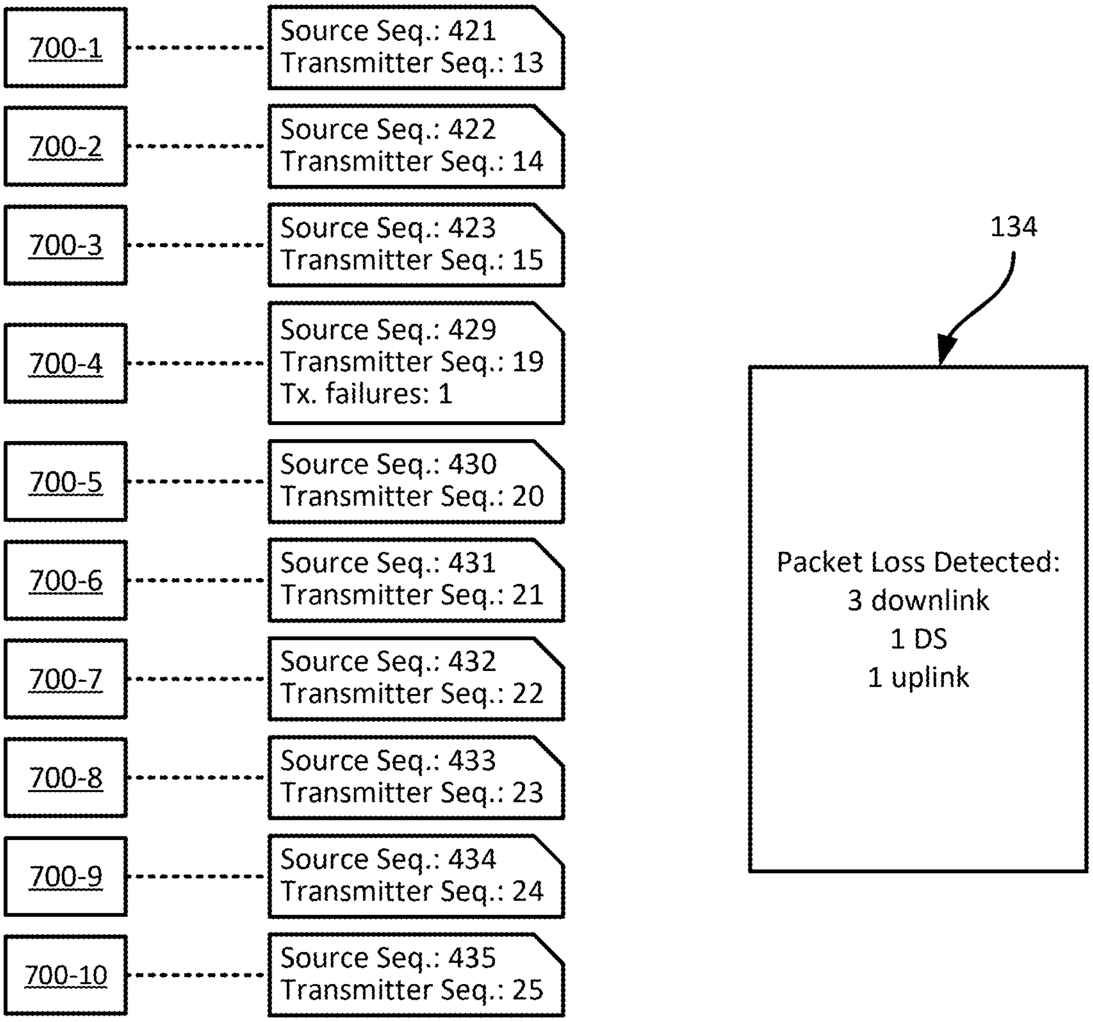
FIG. 7 is a diagram illustrating another example series of datagrams processed via blocks 305-330 of the method of FIG. 2.

FIG. 7 illustrates a further example performance of the method 300. In this example, a series of datagrams 700-1, 700-2, 700-3, 700-4, 700-5, 700-6, 700-7, 700-8, 700-9, and 700-10 are received at the device 112-1. The datagrams 700 include the same sequence numbers as the datagrams 600 in this example, but in the example of FIG. 7, at least one of the datagrams 700 (e.g., the datagram 700-4) also includes a transmission failure count, indicating that the device 112-2 experienced one transmission failure over the uplink segment 144. The transmission failure count can be included in the next datagram after the block of failed transmissions is detected at the source. In other examples, the transmission failure count may also include the specific source sequence numbers encompassed by the transmission failure count.

In this example, the determination at block 310 is affirmative, and at block 315 the device 112-1 determines a datagram loss indicator for the downlink segment 136 of three lost datagrams. The determination at block 320 is affirmative, and the determination at block 325 is also affirmative. At block 330, the device 112-1 is configured to determine an uplink loss indicator, equal to the transmission failure count (one, in this example), and a distribution subsystem loss indicator, equal to the remainder from subtracting both the downlink indicator (e.g., three) and the uplink indicator (e.g., one) from the source sequence number gap (five, in this example). The notification generated at block 340 in this example, can therefore include lost packet counts for each segment of the connection with the device 112-2.

In other examples, datagrams can be processed to detect and segment gaps therein in batches. For example, the device 112-1 can process any datagrams received over a time period (e.g., one second, although shorter or longer time periods can also be used), and to detect missing sequence numbers in the batch of datagrams received over the time period, whether the missing sequence numbers are contiguous or not.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:

receiving, at a wireless communications interface of the computing device over a downlink segment of a connection with a source device, a series of datagrams from the source device, each of the datagrams including a source sequence number and a transmitter sequence number;

determining a size of a first gap in the source sequence numbers of the datagrams;

determining a size of a second gap in the transmitter sequence numbers of the datagrams;

based on the size of the first gap and the size of the second gap, generating a datagram loss indicator and an association of the datagram loss indicator with a portion of the connection; and executing a mitigation action based on the datagram loss indicator.

2. The method of claim 1, wherein the source sequence number is selected from the group consisting of: (i) a transport-level sequence number, and (ii) an application-level sequence number.

3. The method of claim 1, wherein the transmitter sequence number includes a link-layer sequence number.

4. The method of claim 1, wherein determining the size of the first gap includes determining a first count of missing source sequence numbers in the series of datagrams; and wherein determining the size of the second gap includes determining a second count of missing transmitter sequence numbers in the series of datagrams.

5. The method of claim 4, wherein generating the datagram loss indicator includes generating (i) a first datagram loss indicator associated with an upstream portion of the connection, and (ii) a second datagram loss indicator associated with the downlink segment.

6. The method of claim 5, wherein the second datagram loss indicator is equal to the size of the second gap.

7. The method of claim 5, wherein generating the first datagram loss indicator includes:

determining a difference between the first count and the second count.

8. The method of claim 7, wherein generating the first datagram loss indicator includes:

when the difference is non-zero, obtaining a count of transmission failures detected at the source device, from a reporting field in one of the series of datagrams;

generating an uplink datagram loss indicator equal to the count of transmission failures; and generating a distribution datagram loss indicator equal to a difference between the count of transmission failures and the first count.

9. The method of claim 1, wherein executing the mitigation action includes generating a notification containing the datagram loss indicator.

10. A computing device, comprising:

a wireless communications interface; and a processor configured to:

receive, via the wireless communications interface over a downlink segment of a connection with a source device, a series of datagrams from the source device, each of the datagrams including a source sequence number and a transmitter sequence number;

determine a size of a first gap in the source sequence numbers of the datagrams;

determine a size of a second gap in the transmitter sequence numbers of the datagrams;

based on the size of the first gap and the size of the second gap, generate a datagram loss indicator and an association of the datagram loss indicator with a portion of the connection; and execute a mitigation action based on the datagram loss indicator.

11. The computing device of claim 10, wherein the source sequence number is selected from the group consisting of: (i) a transport-level sequence number, and (ii) an application-level sequence number.

12. The computing device of claim 10, wherein the transmitter sequence number includes a link-layer sequence number.

13. The computing device of claim 10, wherein the processor is configured to determine the size of the first gap by determining a first count of missing source sequence numbers in the series of datagrams; and wherein processor is configured to determine the size of the second gap by determining a second count of missing transmitter sequence numbers in the series of datagrams.

14. The computing device of claim 13, wherein the processor is configured to generate the datagram loss indicator by generating (i) a first datagram loss indicator associated with an upstream portion of the connection, and (ii) a second datagram loss indicator associated with the downlink segment.

15. The computing device of claim 14, wherein the second datagram loss indicator is equal to the size of the second gap.

16. The computing device of claim 14, wherein the processor is configured to generate the first datagram loss indicator by:

determining a difference between the first count and the second count.

17. The computing device of claim 16, wherein the processor is configured to generate the first datagram loss indicator by:

when the difference is non-zero, obtaining a count of transmission failures detected at the source device, from a reporting field in one of the series of datagrams;

generating an uplink datagram loss indicator equal to the count of transmission failures; and generating a distribution datagram loss indicator equal to a difference between the count of transmission failures and the first count.

18. The computing device of claim 10, wherein the processor is configured to execute the mitigation action by generating a notification containing the datagram loss indicator.

19. A non-transitory computer-readable medium storing a plurality of computer readable instructions executable by a processor of a computing device to:

receive, via a wireless communications interface of the computing device over a downlink segment of a connection with a source device, a series of datagrams from the source device, each of the datagrams including a source sequence number and a transmitter sequence number;

determine a size of a first gap in the source sequence numbers of the datagrams;

determine a size of a second gap in the transmitter sequence numbers of the datagrams;

based on the size of the first gap and the size of the second gap, generate a datagram loss indicator associated and an association of the datagram loss indicator with a portion of the connection; and execute a mitigation action based on the datagram loss indicator.

20. The non-transitory computer-readable medium of claim 19, wherein the instructions are further executable to generate the datagram loss indicator by generating (i) a first datagram loss indicator associated with an upstream portion of the connection, and (ii) a second datagram loss indicator associated with the downlink segment.

* * * * *